US006973584B2

(12) United States Patent
Na et al.

(10) Patent No.: US 6,973,584 B2
(45) Date of Patent: Dec. 6, 2005

(54) METHOD FOR REDUCING CURRENT CONSUMPTION IN A MOBILE COMMUNICATION TERMINAL

(75) Inventors: Min-Ki Na, Songnam-shi (KR); Jung-Sik Kim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 476 days.

(21) Appl. No.: 10/207,696

(22) Filed: Jul. 29, 2002

(65) Prior Publication Data
US 2003/0023890 A1 Jan. 30, 2003

(30) Foreign Application Priority Data
Jul. 27, 2001 (KR) ........................... 2001-0045449

(51) Int. Cl.[7] ............................................... G06F 1/32
(52) U.S. Cl. ..................... 713/323; 713/300; 713/320
(58) Field of Search ............................... 713/300, 320, 713/323

(56) References Cited

U.S. PATENT DOCUMENTS

| 5,774,704 A | * | 6/1998 | Williams ..................... 713/501 |
| 5,845,074 A | * | 12/1998 | Kobata ....................... 709/219 |
| 5,926,053 A | * | 7/1999 | McDermott et al. ........ 327/298 |
| 6,069,882 A | * | 5/2000 | Zellner et al. ............... 370/423 |
| 6,513,124 B1 | * | 1/2003 | Furuichi et al. ............ 713/322 |
| 6,564,328 B1 | * | 5/2003 | Grochowski et al. ....... 713/320 |
| 6,704,876 B1 | * | 3/2004 | Iacobovici et al. ......... 713/300 |

OTHER PUBLICATIONS

Wolaver, Dan H., Phase-Locked Loop Circuit Design, 1991, Prentice-Hall, Inc., p. 239-240.*

* cited by examiner

Primary Examiner—Lynne H. Browne
Assistant Examiner—Anand B. Patel
(74) Attorney, Agent, or Firm—Dilworth & Barrese, LLP (57) ABSTRACT

A method for reducing current consumption of a mobile terminal is provided. The method includes setting a task as an initial idle task of the mobile terminal for performing a simple infinite loop in a state where all of the effective tasks performed by a program of the mobile terminal are blocked, counting global variable values of the idle task for a predetermined time according to a timer interrupt signal generated by the timer at regular intervals and storing the global variable values of the idle task as a reference value of an idle task of a program of the mobile terminal, resetting the counted value, measuring by counting the global variable values of the idle task where an effective task occupies the idle task for a predetermined time and storing the global variable values of the idle task as an idle value of the effective task according to a timer interrupt generated every predetermined time by the timer when the program of the mobile terminal performs the effective task, dividing the measured idle value of the effective task by the reference value of the idle task, to thus calculate a program idle rate of the mobile terminal, and storing the program idle rate, and changing a PLL value according to the program idle rate of the mobile terminal and varying a main clock frequency of a CPU of the mobile communication terminal.

7 Claims, 6 Drawing Sheets

| CPU MAIN CLOCK VARIABLE FREQUENCY (STORED) | REFERENCE VALUE OF IDLE TASK | APPROPRIATE IDLE TARGET VALUE (STORED) | IDLE VALUE OF EFFECTIVE TASK (MEASURED VALUE) |
|---|---|---|---|
| $F_{min}$ | $V_{min}$ | $AV_{min}$ | X |
| $F_{min} + \Delta F$ | $V_1$ | $AV_1$ | $X_1$ |
| $F_{min} + (2 \times \Delta F)$ | $V_2$ | $AV_2$ | $X_2$ |
| $F_{min} + (3 \times \Delta F)$ | $V_3$ | $AV_3$ | $X_3$ |
| .. | .. | .. | .. |
| $F_{max}$ | $V_{max}$ | $AV_{max}$ | $X_n$ |

$\Delta F$: MINIMUM FREQUENCY VARIABLE RATE OF PLL
A: APPROPRIATE RATE FOR CALCULATING APPROPRIATE TARGET PROGRAM IDLE VALUE

METHOD FOR REDUCING CURRENT CONSUMPTION IN A MOBILE COMMUNICATION TERMINAL

PRIORITY

This application claims priority to an application entitled "Method for Reducing Current Consumption in a Mobile Communication Terminal" filed in the Korean Industrial Property Office on Jul. 27, 2001 and assigned Serial No. 2001-45449, the contents of which are hereby incorporated by reference.

BACKGROUND OF THE INVENTION

1. Field of the Invention

The present invention relates generally to a method for reducing current consumption in an electronic apparatus, and in particular, to a method for reducing current consumption in equipment such as a mobile communication terminal, a personal digital assistant (PDA), and a notebook computer.

2. Description of the Related Art

In general, an operation mode of a mobile communication terminal is divided into a traffic mode (or busy mode) and a suspended mode. The suspended mode is subdivided into an idle mode, in which a call is performed according to a key input by a user, and a sleep mode, in which power consumption is minimized when the mobile communication terminal is not used for a predetermined time.

In the idle mode, power is applied to the respective units of the mobile communication terminal. In the sleep mode, however, power is applied only to the most essential units such as a display, a central processing unit (CPU), and a memory, and further, power is periodically applied to a receiver of the mobile terminal.

In such a conventional method, a clock generator for the sleep mode is separately included in order to facilitate the reduction of power consumption of the mobile communication terminal. Therefore, a main clock of the CPU is fixed to a high frequency in the traffic mode, and a low-frequency clock output from a clock generator for the sleep mode is used as the main clock of the CPU in the sleep mode.

From a point of view of the CPU main clock of the conventional mobile communication terminal, the traffic state and the idle state both belong to the traffic mode. Accordingly, in both the traffic state and the idle state, the mobile communication terminal operates with a CPU clock having a high frequency. This means that the mobile communication terminal operates with a maximum clock frequency that is higher than a clock frequency required for operation in the idle state. As a result, the mobile communication terminal consumes more current than a necessary amount of current when operating in idle mode. This causes a reduction in a reception standby time of the mobile communication terminal by reducing the charge time of the battery.

SUMMARY OF THE INVENTION

It is, therefore, an object of the present invention to provide a method for reducing current consumption of a mobile communication terminal by varying a frequency of a central processing unit (CPU) main clock according to an operation state of the mobile communication terminal.

It is another object of the present invention to provide a method for increasing a reception standby time of a mobile communication terminal.

To achieve the above and other objects, there is provided a method for reducing current consumption of a mobile communication terminal including a timer and a phase locked loop (PLL) capable of varying a main clock frequency of a CPU (Central Processing Unit). The method comprises the steps of: if all effective tasks performed by a program of the mobile communication terminal are blocked, performing a simple infinite loop, performing a count idle task for counting a global variable value for a predetermined time, and storing the global variable value of the count idle task, counted for the predetermined time according to a timer interrupt generated by the timer every unit time, as a reference value of an idle task in a program of the mobile communication terminal; if the program performs a first effective task, performing the count idle task for a period where the idle task is performed, according to a timer interrupt generated by the timer every unit time, and storing the counted global variable value as an idle value of the first effective task; calculating a program idle rate of the mobile communication terminal by dividing the idle value of the first effective task by the reference value, storing the calculated program idle rate, and setting a target value according to a value calculated by multiplying the program idle rate by the reference value; and if the program performs a second effective task, measuring an idle value of the second effective task by performing the count idle task, comparing the measured idle value with the target value, decreasing the main clock frequency through the PLL if the measured idle value of the effective task is larger than the target value, and increasing the main clock frequency if the measured idle value of the second effective task is smaller than the target value, thereby adjusting the main clock frequency.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail. While this invention will now be described with reference to an embodiment thereof, in which a mobile communication terminal is disclosed, it will be understood by those skilled in the art that various changes in form and details may be made therein without departing from the spirit and scope of the invention. In particular, the present invention can also be applied to an electronic apparatus, whose current consumption is to be reduced by dividing an operation mode into a traffic mode and a suspended mode, such as a personal digital assistant (PDA) and a notebook computer.

The present invention will now be described in detail with reference to the attached drawings.

Figure 1:
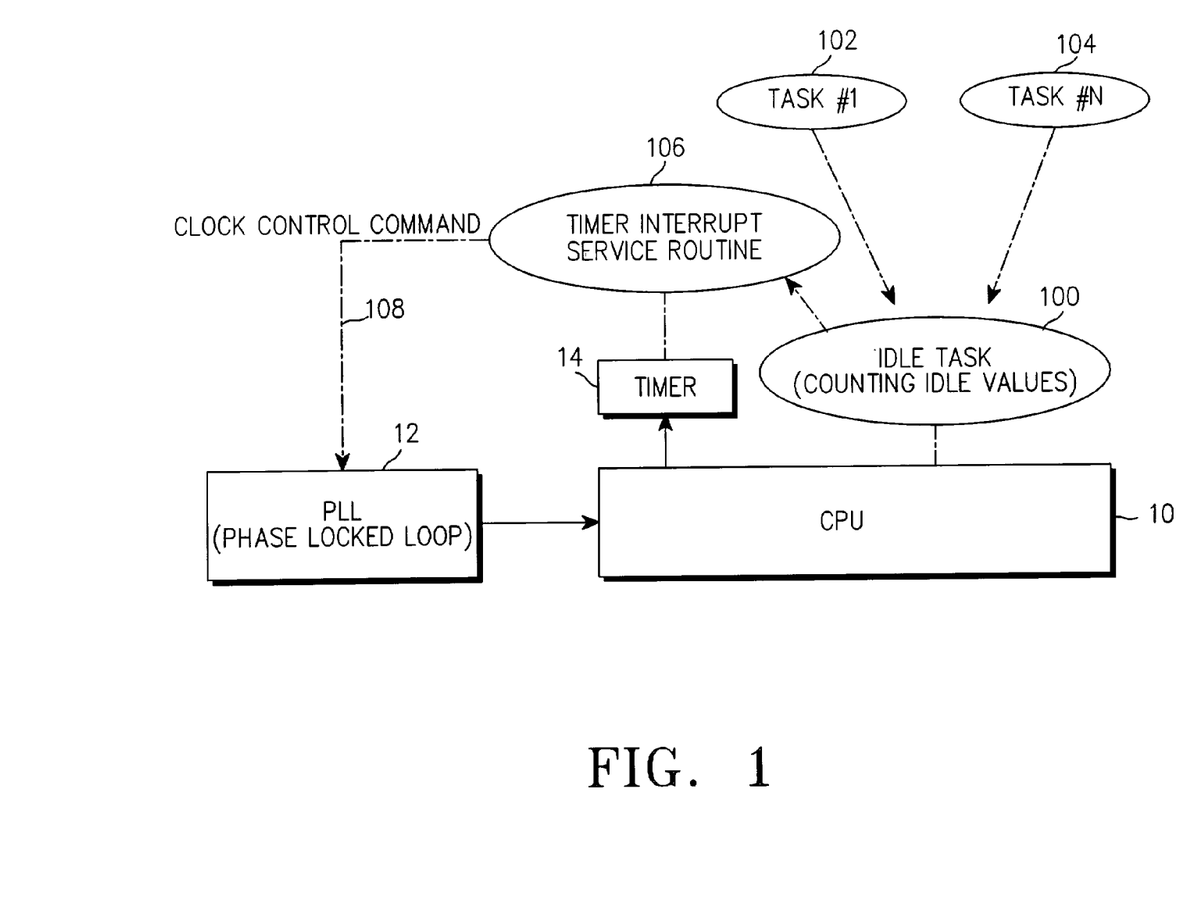
FIG. 1 is a block diagram of a mobile communication terminal according to an embodiment of the present invention.

FIG. 1 illustrates a mobile communication terminal according to an embodiment of the present invention. A central processing unit (CPU) 10 controls the overall operation of the mobile communication terminal, and in particular, performs overall control for reducing current consumption of the terminal according to the present invention. The CPU 10 operates an operating system (OS) program for performing the overall operation of the mobile communication terminal and performs tasks of the OS program, including a count idle task 100 and task #1 102 through task #n 104. The count idle task 100 adds count functions to a task for performing a simple infinite loop. The count idle task 100 according to the embodiment of the present invention counts idle values of the tasks 102, and 104 in order to calculate an amount of idle job operated in the mobile communication terminal, to thus reduce the current consumption of the mobile communication terminal.

A timer 14 generates a timer interrupt signal at regular intervals, to thus run an interrupt service routine 106. The interrupt service routine 106 reads global variable values of the tasks 100, 102, and 104, counted for a predetermined time, and resets the counted global variable values. At this time, the CPU 10 compares the read idle values of the tasks 100, 102, and 104 with appropriate idle target values at the main clock frequency of the CPU 10, which are previously stored in a memory (not shown) and, accordingly, determines whether to vary the main clock frequency of the CPU 10. A phase locked loop (PLL) 12 varies the main clock frequency of the CPU 10 according to a clock control command 108 from the CPU 10.

Figure 2:
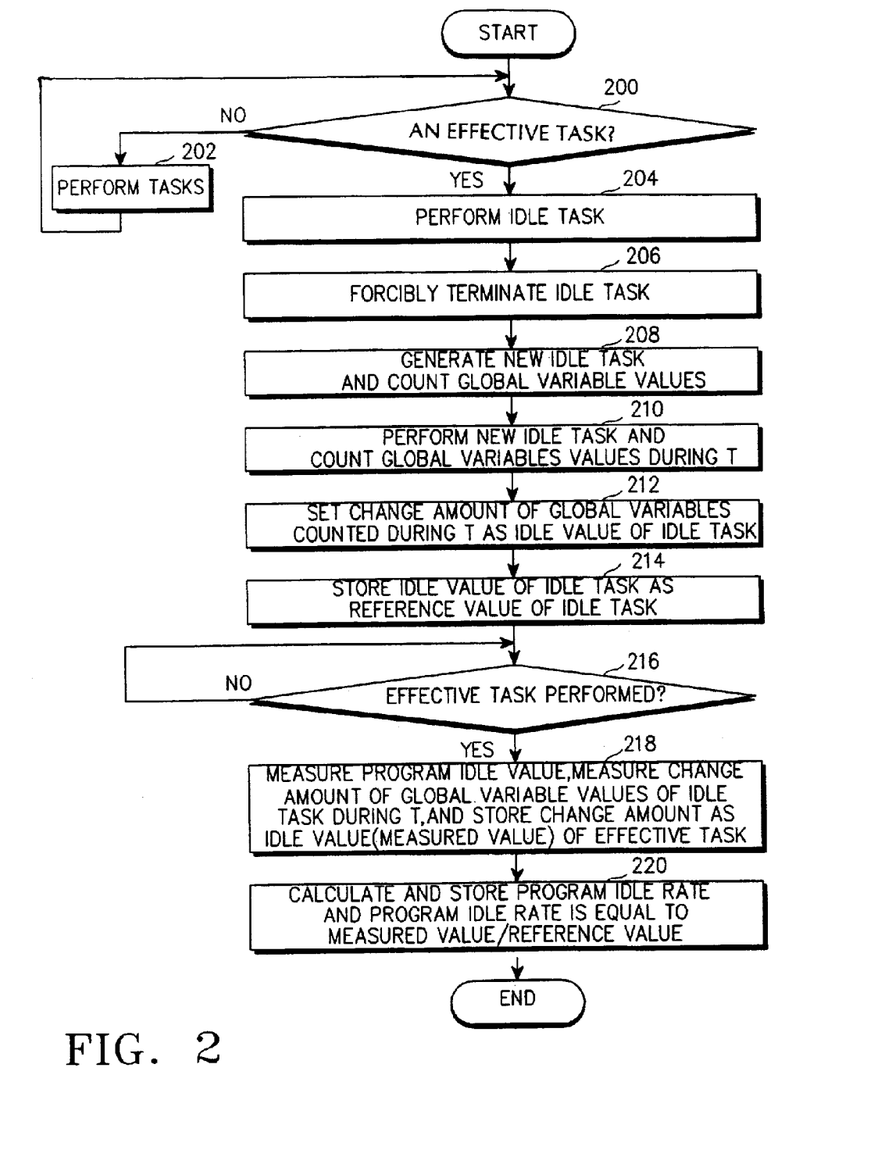
FIG. 2 is a control flowchart for calculating a program idle rate in the mobile communication terminal according to the embodiment of the present invention.

FIG. 2 is a control flowchart for calculating a program idle rate in the mobile communication terminal according to the embodiment of the present invention. The method for reducing the current consumption according to the present invention will now be described in detail with reference to FIGS. 1 and 2.

Referring to FIG. 2, after the mobile terminal is initialized, the CPU 10 of FIG. 1 determines in step 200 whether there is an effective task (i.e., Tx task, Rx task, Srcher task, MUX task, L2 task, L3 task, UI task, etc.) to be operated. "Effective" means a task is not a suspended state. The CPU 10 proceeds to step 204 and performs the idle task when there is not an effective task to be operated. At this time, the determination of the step 200 and the idle task performed in step 204 have a minimum (or lowest) priority order '0'. In the idle task, the mobile communication terminal operates in the idle mode. That is, when the mobile communication terminal operates, a plurality of tasks having their own functions occupy the CPU 10. In the suspended mode where there is no effective task to be processed, the idle task performed without a special function occupies the CPU 10. While the effective task is performed, the CPU 10 is alternately occupied by the effective task and the idle task. Therefore, it is possible to measure an idle rate of the program by measuring the time, for which the idle task is performed for a predetermined time.

In calculating the program idle rate, the CPU 10 forcibly terminates the idle task in step 206 in order to calculate an occupation time of the CPU 10 occupied by the idle task, and then generates a count idle task 100 including a function of counting the global variable values in step 208 according to the present invention. The count idle task 100 performs a simple infinite loop, counts global variable values, and is assigned a minimum priority order '1' that can be given by a user.

In step 210, the CPU 10 performs the count idle task 100 in order to measure the time of the idle task, operated for a predetermined time, and then counts the global variable values increased for a predetermined time. In step 212, the CPU 10 sets a change in the global variables as an idle value of the idle task of idle state by means of the timer interrupt service routine 106 initiated by an timer interrupt signal caused by the timer 14 of FIG. 1. The timer interrupt service routine 106 reads the change in the global variables, and at the same time, resets counting. The idle value set in the step 212 is stored as a reference value of the idle task of the program of the mobile communication terminal by the CPU 10 in step 214.

Upon detecting an effective task in step 216 after storing the reference value of the idle task, the CPU 10 proceeds to step 218. While the effective task is performed, the CPU 10 is occupied by the effective task and the idle task, and the occupation time by the respective tasks is not constant. Therefore, the occupation time by the effective task and the occupation time by the idle task for the predetermined time t are also not constant. Accordingly, it is necessary to measure how long the CPU 10 is occupied by the idle task, every predetermined time t. In step 218, in order to measure how long the idle task occupies the CPU 10 for the predetermined time, the CPU 10 performs the count idle task 100 while the idle task occupies the CPU 10, measures the change in the global variables and stores the change as an idle value (measured value) of the effective task.

In step 220, the CPU 10 divides the idle value of the effective task measured in step 218 by the reference value of the idle task of the program of the mobile communication terminal, which is stored in the step 214, to thus calculate the program idle rate of the mobile communication terminal, and stores the calculated program idle rate. Mathematically, that is an equation—PROGRAM_IDLE_RATE=(MEASURED IDLE VALUE)/(REFERENCE IDLE VALUE).

That is, in the state where the effective task does not operate but only the idle task operates after initialization of the mobile communication terminal, the change in the global variable values continuously increased by the count idle task 100 for a predetermined time is set as the reference value of the idle task. The CPU 10 compares the reference value with a measured value of the count idle task 100, determined by measuring an occupation time of the CPU 10 by the idle task during the effective task. In this way, the CPU 10 can calculate the idle rate of the currently performed program according to a ratio of the measured idle task value to the reference idle task value.

The method according to the present invention can reduce the total current consumption of the mobile communication terminal by calculating the idle rate of the program in order to determine an occupation time of the CPU 10 occupied by the current program and controlling the PLL 12 so as to maintain the idle rate, to thus adjust the clock frequency of the CPU 10.

Advantages of the method for reducing the current consumption of the mobile communication terminal according to the present invention by varying the clock of the CPU 10 so as to maintain the program idle rate will now be described with reference to FIGS. 3 and 4.

Figure 3:
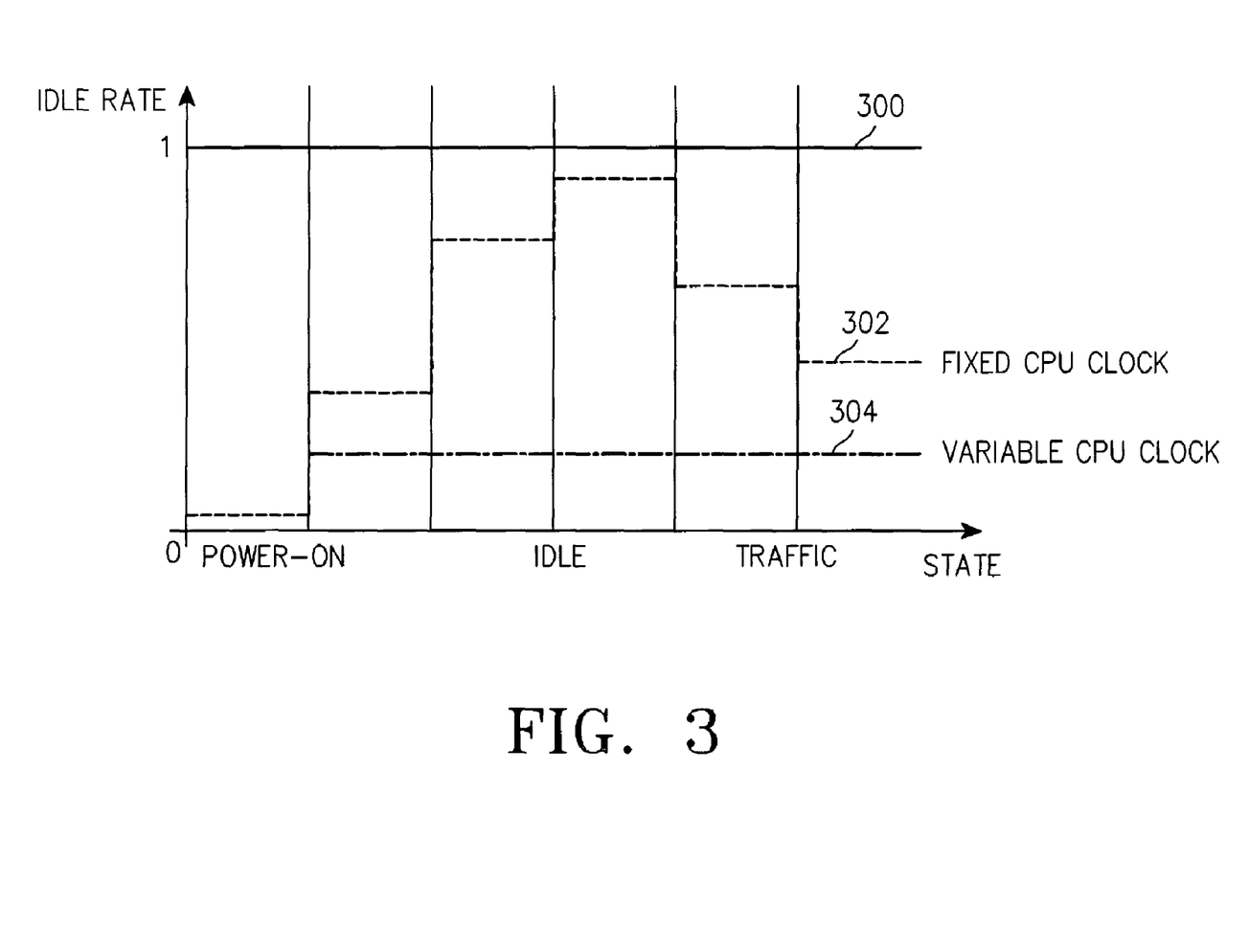
FIG. 3 is a graph showing a program idle rate based on a variable central processing unit (CPU) clock according to the embodiment of the present invention in comparison with a program idle rate based on a fixed CPU clock.
Figure 4:
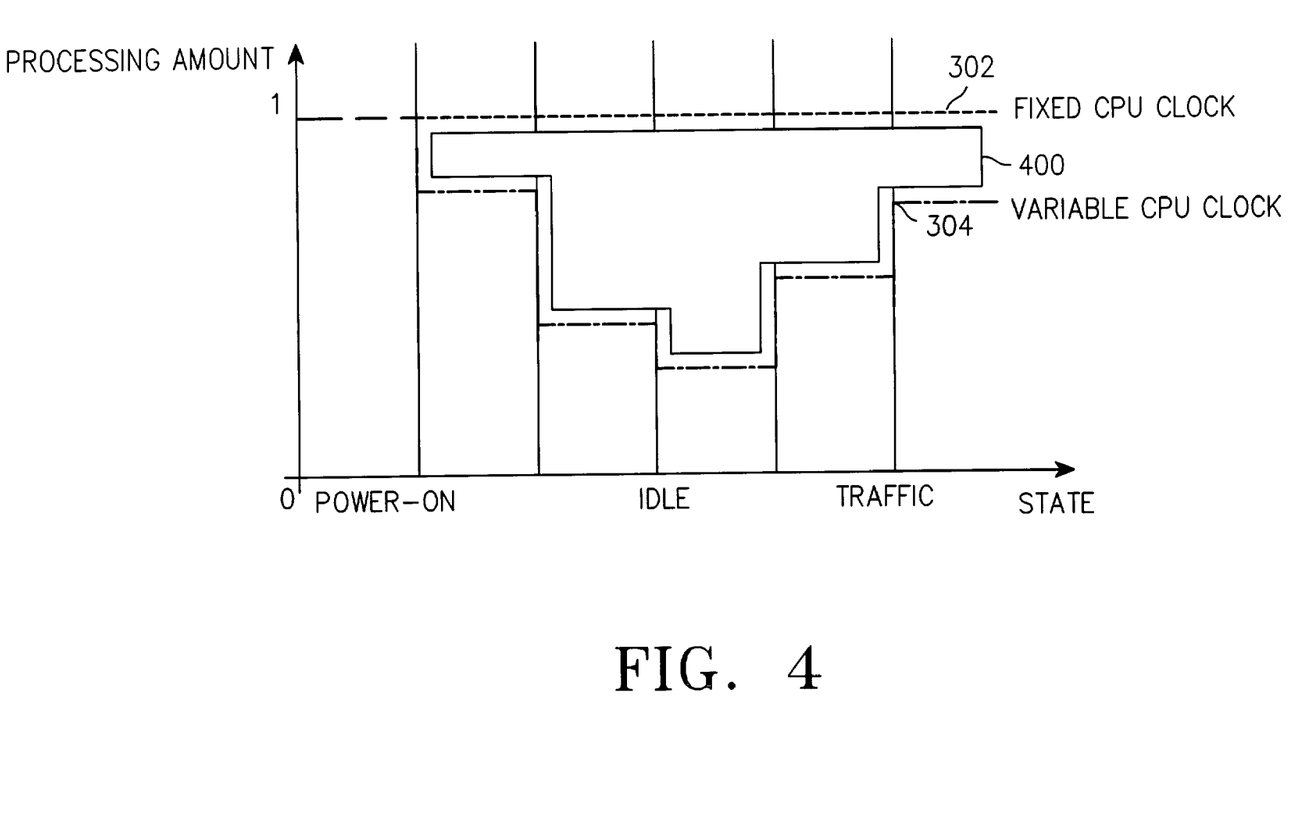
FIG. 4 is a graph showing the program idle rates of FIG. 3 by processing amounts.

FIG. 3 is a graph showing a program idle rate based on a CPU clock according to the embodiment of the present invention in comparison with a program idle rate based on a fixed CPU clock. FIG. 4 is a graph showing the program idle rates of FIG. 3 by processing amounts.

As shown in FIG. 3, if it is assumed that an entire idle rate 300 of the mobile communication terminal is 1, the program idle rate is variable according to a power-on state, an idle state, and a traffic state in the case where a conventional fixed CPU clock 302 is used. According to the conventional technology, the mobile communication terminal operates with the same fixed CPU clock 302 both in the traffic state where a large task is performed right after the power-on, and in the idle state where a relatively small task is performed, which will now be described by the amount of the performed processing as shown in FIG. 4. When the conventional fixed CPU clock 302 is used, a CPU clock 400 of FIG. 4 is wasted by performing the task with the maximum clock in the respective states regardless of the state of the mobile communication terminal. In a general digital logic circuit, most current consumption occurs when a signal is switched, that is, a logic level transits from '0' to '1' or from '1' to '0. Therefore, the entire mobile communication terminal consumes more current than a necessary amount of current because the idle task that occupies most time left after performing the meaningful program and the effective task is performed with the maximum clock.

When the idle rate and the processing amount in the case where a variable CPU clock 304 according to the present invention is used are compared with the idle rate and the processing amount in the case where the conventional fixed CPU clock 302 is used, the CPU 10 has the idle rate in inverse proportion to the amount of the program to be processed. Therefore, a wasted CPU clock is generated in the mobile communication terminal using the fixed CPU clock 302. The waste of the CPU clock leads to a waste of current in the mobile communication terminal. Meanwhile, in the case where the variable CPU clock 304 according to the present invention is used, it is possible to prevent the CPU clock 400 from being wasted, as shown when the fixed CPU clock 302 of FIG. 4 is used, because the mobile communication terminal does not operate with a higher frequency than a necessary frequency according to the state of the task performed by the CPU 10.

In order to maintain the program idle rate calculated in FIG. 2 at an appropriate level, a value of the PLL 12 is changed according to the program idle rate, thus to vary the main clock frequency of the CPU 10. At this time, the clock frequency of the CPU 10 to be varied is calculated from the program idle rate. Because it takes long to change the value of the PLL 12, the value obtained by multiplying the reference value of the idle task by the target program idle rate is compared with the measured value. Accordingly, it is possible to adjust the clock of the CPU 10 based on the comparison results.

When the clock of the CPU 10 is changed according to the present invention, variable frequencies are set with respect to the main clock of the CPU 10 in order to calculate the changed program idle rate. The reference values in the idle task are previously measured corresponding to the variable frequencies. An appropriate rate is multiplied by the reference values of the idle tasks, thus to calculate the appropriate idle target values of the effective task. The frequencies of the variable CPU main clock, the reference values of the idle task, and the appropriate idle target values of the effective task are correspondingly stored. The measured idle value of the effective task is compared with the appropriate idle target value of the correspondingly stored effective task, to adjust the main clock frequency of the CPU 10.

Figure 5:
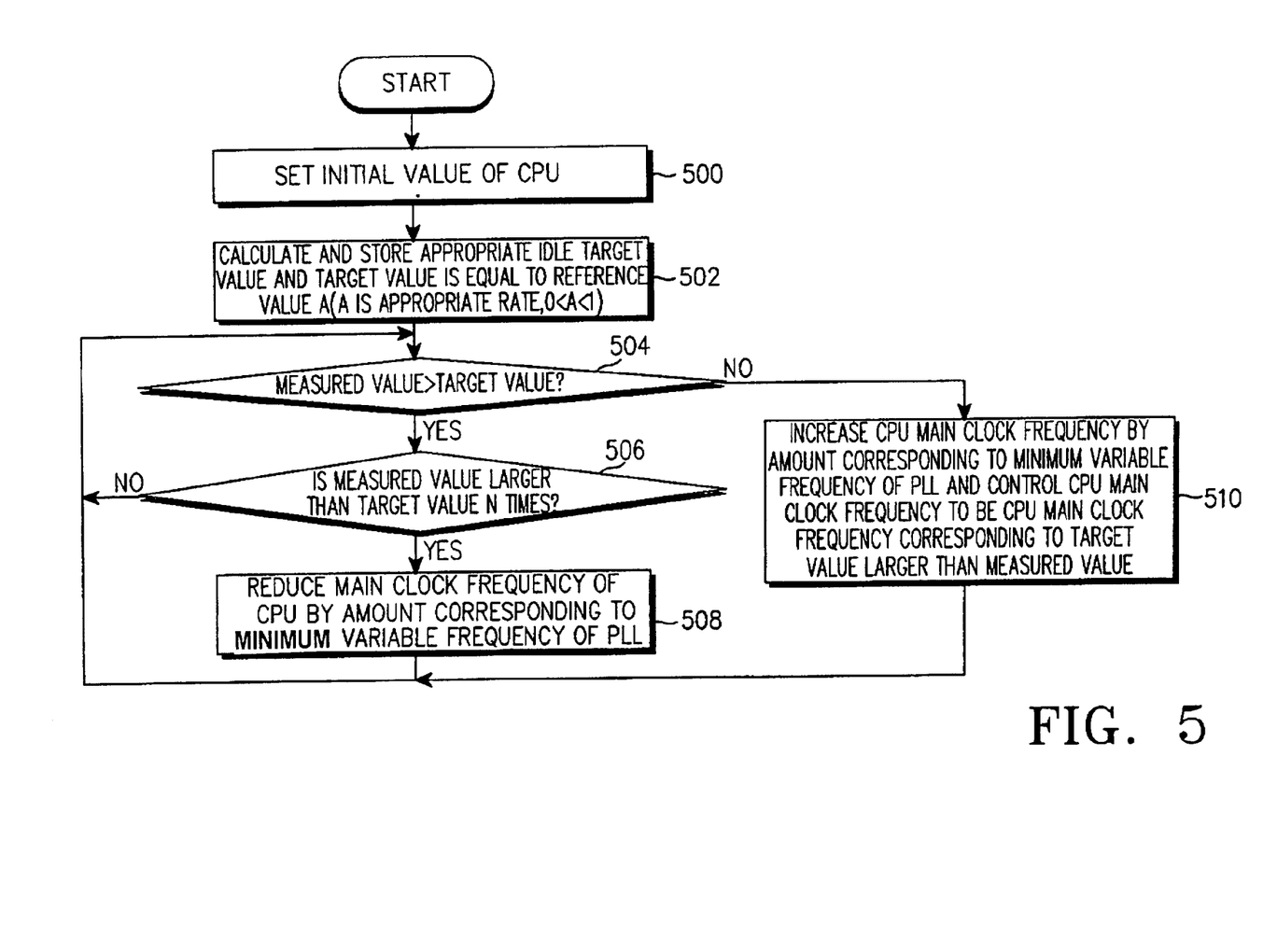
FIG. 5 is a control flowchart for determining an operation frequency of the CPU according to the embodiment of the present invention.
Figure 6:
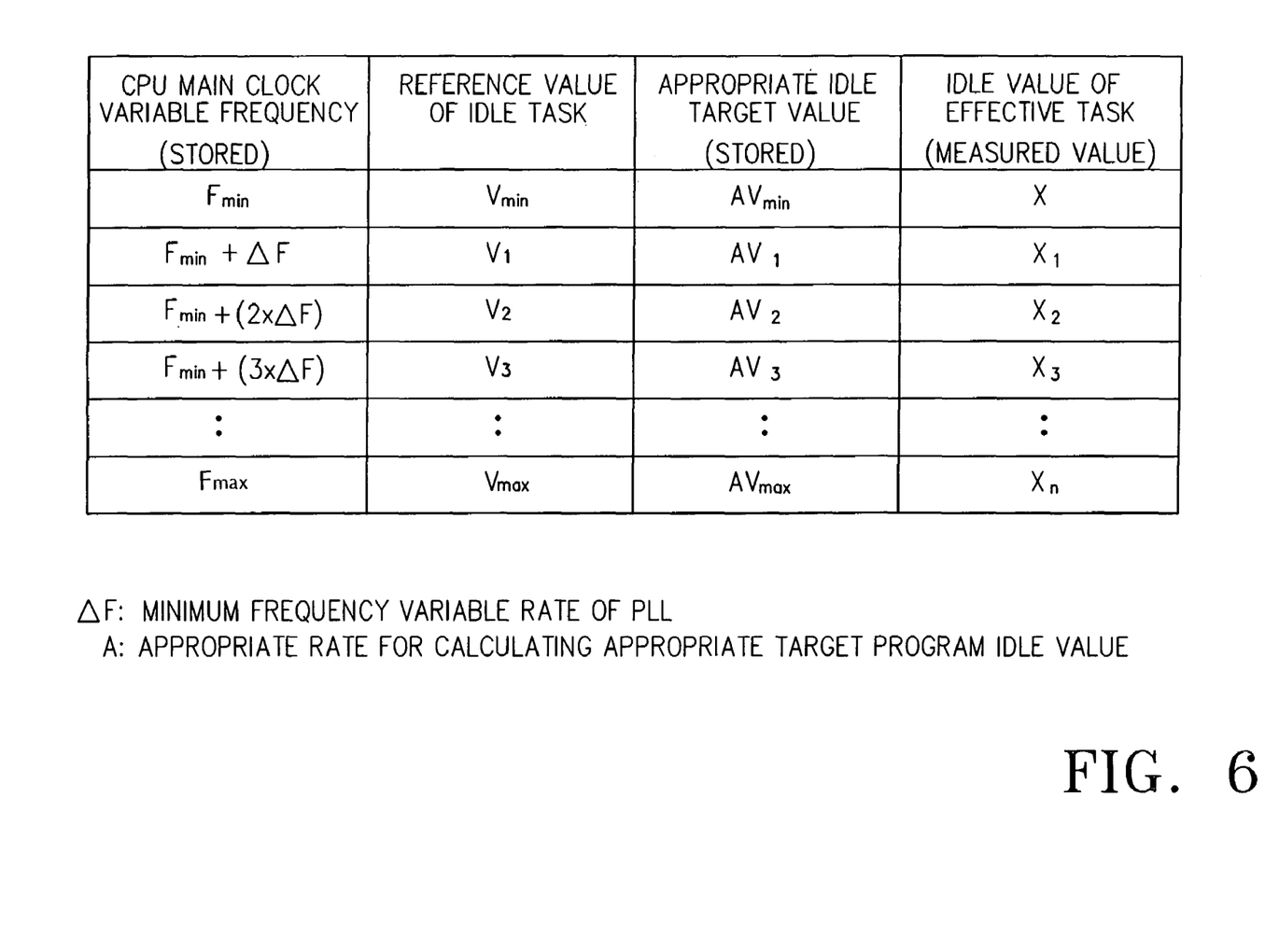
FIG. 6 a table showing variable frequencies for determining a CPU main clock frequency, reference values of an idle task, and appropriate idle target values of an effective task.

This will now be described with reference to FIGS. 5 and 6. FIG. 5 is a control flowchart for determining the operation frequency of the CPU according to the embodiment of the present invention. FIG. 6 shows variable frequencies for determining a CPU main clock frequency, the reference values of an idle task, and the appropriate idle target values of an effective task.

Referring to FIG. 5, in step 500, the CPU 10 sets an initial value. In step 502, the CPU 10 calculates the appropriate idle target value for determining the main clock frequency of the CPU 10 by multiplying the appropriate rate by the reference value of the idle task, and stores the appropriate idle target value as shown in FIG. 6. The CPU 10 determines the main clock frequency of the CPU 10 corresponding to the appropriate idle target value stored as shown in FIG. 6 in step 504. Mathematically, (APPROTRIATE IDLE TARGET VALUE) =A×(REFERENCE IDLE VALUE). Here, "Reference Value" is an already tested and calculated table date.

In step 504, the CPU 10 measures an idle value of an effective task, and determines whether the measured idle value of the effective task is larger than a proper target idle value of the effective task. If the measured value is larger than the target value, the CPU 10 proceeds to step 506. If the measured value is less than the target value, the CPU 10 proceeds to step 510. In step 506, the CPU 10 determines whether the measured value is n or more times larger than the target value, and proceeds to step 508, if the measured value is n or more times larger than the target value. In step 508, the CPU 10 decreases a CPU main clock frequency by the minimum variable frequency of the PLL, since the current clock frequency of the CPU 10 is unnecessarily high. After step 508, the CPU 10 returns to step 504.

In step 510, since the current clock frequency of the CPU 10 is lower than a desired clock frequency, the CPU 10 increases the main clock frequency by the minimum variable frequency of the PLL 12 to the main clock frequency corresponding to the garget value larger than the measured value.

The CPU 10 increases the main clock frequency of the CPU 10 by the amount corresponding to the minimum variable frequency of the PLL 12 in step 508, when the measured idle value of the effective task is larger than the appropriate idle target value of the effective task in step 504. Otherwise, when the measured idle value of the effective task is smaller than or equal to the appropriate idle target value of the effective task, the CPU 10 reduces the main clock frequency of the CPU 10 by the amount corresponding to the minimum variable frequency of the PLL 12 in step 510, to thereby adjust the main clock frequency of the CPU 10 to a CPU main clock frequency corresponding to the target value larger than the measured value.

As described above, the present invention can reduce current consumption of the mobile communication terminal by varying the main clock frequency of the CPU according to the state of the mobile communication terminal so as to maintain the program idle rate. Also, it is possible to increase the reception standby time of the mobile communication terminal by varying the main clock frequency of the CPU according to the state of the mobile communication terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for reducing current consumption of a mobile communication terminal including a timer and a phase locked loop (PLL) capable of varying a main clock frequency of a CPU (Central Processing Unit), the method comprising the steps of:

(a) if all effective tasks performed by a program of the mobile communication terminal are blocked, performing a simple infinite loop, performing a count idle task for counting a global variable value for a predetermined time, and measuring the global variable value of the count idle task, counted for the predetermined time according to a timer interrupt generated by the timer every unit time, as a reference value of an idle task;

(b) if the mobile communication terminal performs an effective task according to a random program operation, performing the count idle task for a period where the idle task is performed, according to a timer interrupt generated by the timer every unit time, and measuring the counted global variable value as an idle value of the effective task;

(c) calculating a random idle rate representing the CPU occupation rate of the idle task by dividing the idle value of the effective task by the reference value, while the random program is performed, and setting a target idle value according to a value calculated by multiplying a specific idle rate, which is previously calculated corresponding to a main clock frequency capable of being set in the CPU, by the reference value; and (d) if the program performs an effective task, measuring an idle value of the effective task by performing the count idle task, comparing the measured idle value with the idle target value, decreasing the main clock frequency through the PLL if the measured idle value of the effective task is larger than the idle target value, and increasing the main clock frequency if the measured idle value of the effective task is smaller than the idle target value, thereby adjusting the main clock frequency.

2. The method of claim 1, wherein step (c) comprises the step of calculating idle rates with respect to all of the tasks generated during a normal operation of the mobile communication terminal.

3. A method for reducing current consumption of a mobile communication terminal including a timer and a phase locked loop (PLL) capable of varying a clock speed, the method comprising the steps of:

(a) forcibly terminating an idle task of the mobile communication terminal, which is performed in a state where all effective tasks performed by a program of the mobile communication terminal are not operated;

(b) after the forcible termination, performing a simple infinite loop, and performing a count idle task for counting a global variable value for a predetermined time;

(c) setting the global variable value counted by the count idle task for the predetermined time, as an idle value of the idle task;

(d) setting the idle value of the idle task as a reference value, counting, if the mobile communication terminal performs an effective task according to a random program operation, a global variable value by performing the count idle task while the idle task is performed, and measuring the counted global variable value as an idle value of the effective task;

(e) calculating a random idle rate by dividing the idle value of the effective task by the reference value; and (f) calculating an idle target value by multiplying the reference value of the idle task in the program by a previously calculated idle rate corresponding to a main clock frequency capable of being set in a CPU (Central Processing Unit), storing the calculated idle target value, determining the main clock frequency of the CPU according to the stored target idle value, measuring, if the program performs an effective task, an idle value of the effective task by performing the count idle task, comparing the measured idle value with the idle target value, and adjusting the main clock frequency through the PLL according to the comparison results.

4. The method of claim 3, wherein the count idle task is assigned a minimum priority order that can be assigned by a user.

5. The method of claim 3, wherein step (f) comprises the steps of:

(f1) setting variable frequencies with respect to the main clock of the CPU;

(f2) measuring reference values in the idle task corresponding to the set variable frequencies;

(f3) multiplying an appropriate rate by the measured reference values of the idle tasks, to calculate appropriate idle target values of the effective task;

(f4) storing the variable frequencies, the reference values of the idle task, and the appropriate idle target values of the effective task; and (f5) measuring the idle value of the effective task and determining as the main clock frequency of the CPU a frequency corresponding to the appropriate idle target value of the effective task, which is stored in association with the idle value of the effective task, among variable frequencies with respect to the main clock of the CPU, when the effective task is performed.

6. The method of claim 3, wherein the step (f) comprises the steps of:

setting frequencies variable according to a main clock of the CPU;

measuring the reference value of the idle task according to the set variable frequencies;

calculating proper idle task values of the effective task by multiplying the measured reference values of the idle task by a proper ratio;

storing the variable frequencies, the reference values of the idle task, and the proper target idle values of the effective task in association with one another;

setting a proper target value among the target values; and if the program performs the effective task, measuring an idle value of the effective task, comparing the measured idle value with the proper target value of the effective task, decreasing the main clock frequency of the CPU by a minimum variable frequency of the PLL if the measured idle value of the effective task is larger than the proper target value of the effective task, and increasing the main clock frequency of the CPU by the minimum variable frequency of the PLL if the measured idle value of the effective task is smaller than the proper target value of the effective task, thereby determining the main clock frequency.

7. The method of claim 3, wherein step (f) comprises the steps of:

comparing the measured idle value of the effective task with the appropriate idle target value of the effective task; and varying the main clock frequency of the CPU according to a minimum variable frequency of the PLL, when the compared value is constant over a predetermined number of the comparisons.

* * * * *